US008458744B2

(12) United States Patent
Dai et al.

(10) Patent No.: US 8,458,744 B2
(45) Date of Patent: Jun. 4, 2013

(54) METHOD FOR REDUCING CHANNEL CHANGE TIMES AND SYNCHRONIZING AUDIO/VIDEO CONTENT DURING CHANNEL CHANGE

(75) Inventors: Jiwang Dai, Princeton Junction, NJ (US); Alan Jay Stein, Princeton Junction, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 281 days.

(21) Appl. No.: 12/312,394

(22) PCT Filed: Dec. 13, 2006

(86) PCT No.: PCT/US2006/047633
§ 371 (c)(1),
(2), (4) Date: May 7, 2009

(87) PCT Pub. No.: WO2008/057110
PCT Pub. Date: May 15, 2008

(65) Prior Publication Data
US 2010/0064316 A1 Mar. 11, 2010

Related U.S. Application Data

(60) Provisional application No. 60/857,371, filed on Nov. 7, 2006.

(51) Int. Cl.
*G06F 3/00* (2006.01)
*G06F 13/00* (2006.01)
*H04N 5/445* (2011.01)

(52) U.S. Cl.
USPC ................................................ 725/38; 725/39

(58) Field of Classification Search
USPC ............................................. 725/38–39, 151
See application file for complete search history.

(56) References Cited

U.S. PATENT DOCUMENTS 5,710,798 A 1/1998 Campana, Jr.
6,334,217 B1 12/2001 Kim
(Continued)

FOREIGN PATENT DOCUMENTS

EP 1139665 10/2001
(Continued)

OTHER PUBLICATIONS

Keutgen et al.:"Multi-tier Architecture for Distributed Interactive Simulation over Broadcast Channels", IST-1999-12100,pp. 27-39.
(Continued)

*Primary Examiner* — Pankaj Kumar
*Assistant Examiner* — Charles N Hicks
(74) *Attorney, Agent, or Firm* — Robert D. Shedd; Paul P. Kiel

(57) ABSTRACT

A digital A/V apparatus provides reduced channel changes times and maintains synchronization between audio and video content during a channel change event. According to an exemplary embodiment, the digital A/V apparatus includes at least one signal receiver for receiving a first audio stream, a first video stream and a second video stream, wherein the first and second video streams represent the same program and the first video stream has at least one characteristic different from the second video stream; a first audio signal processor for processing the first audio stream to generate a first processed audio stream; a first video signal processor for processing the first video stream to generate a first processed video stream; a second video signal processor for processing the second video stream to generate a second processed video stream having a delay with respect to the first processed video stream; a first buffer for buffering the first processed audio stream to provide de-jittering; a renderer for rendering the first processed audio stream and the second processed video stream in response to a channel change command; a switch for switching from the second processed video stream to the first processed video stream after the renderer begins rendering the second processed video stream, and thereby causing the renderer to begin rendering the first processed video stream; and whereby synchronization between the first processed audio stream and the first processed video stream is maintained during a channel change event.

9 Claims, 4 Drawing Sheets

U.S. PATENT DOCUMENTS

| | | | |
|---|---|---|---|
| 7,430,222 B2 | 9/2008 | Green et al. | |
| 2002/0040481 A1 | 4/2002 | Okada et al. | |
| 2003/0159157 A1 | 8/2003 | Chan | |
| 2003/0196211 A1* | 10/2003 | Chan | 725/131 |
| 2004/0001500 A1 | 1/2004 | Castillo | |
| 2005/0190781 A1 | 9/2005 | Green et al. | |
| 2006/0075428 A1* | 4/2006 | Farmer et al. | 725/38 |
| 2006/0230176 A1* | 10/2006 | Dacosta | 709/235 |
| 2006/0294540 A1* | 12/2006 | Perlman | 725/31 |
| 2009/0245393 A1* | 10/2009 | Stein et al. | 375/240.28 |

FOREIGN PATENT DOCUMENTS

| | | |
|---|---|---|
| JP | 2008-521363 | 6/2008 |
| WO | WO2004062291 | 7/2004 |
| WO | 2004/070953 A2 | 8/2004 |
| WO | WO 2004070953 A2 * | 8/2004 |
| WO | 2005/112465 A1 | 11/2005 |
| WO | 2006/016950 A1 | 2/2006 |
| WO | 2006/057938 A2 | 6/2006 |

OTHER PUBLICATIONS

Cho et al.:"Improvement of channel Zapping Time in IPTV services Using the Adjacent Groups Join-Leave Method", Network Technology Laboratory, ETRI, pp. 971-975.

Boyce et al.: :Fast Efficient Channel Change, IEEE, Thomson Coporate Research, Princeton, NJ, USA, 2005.

* cited by examiner

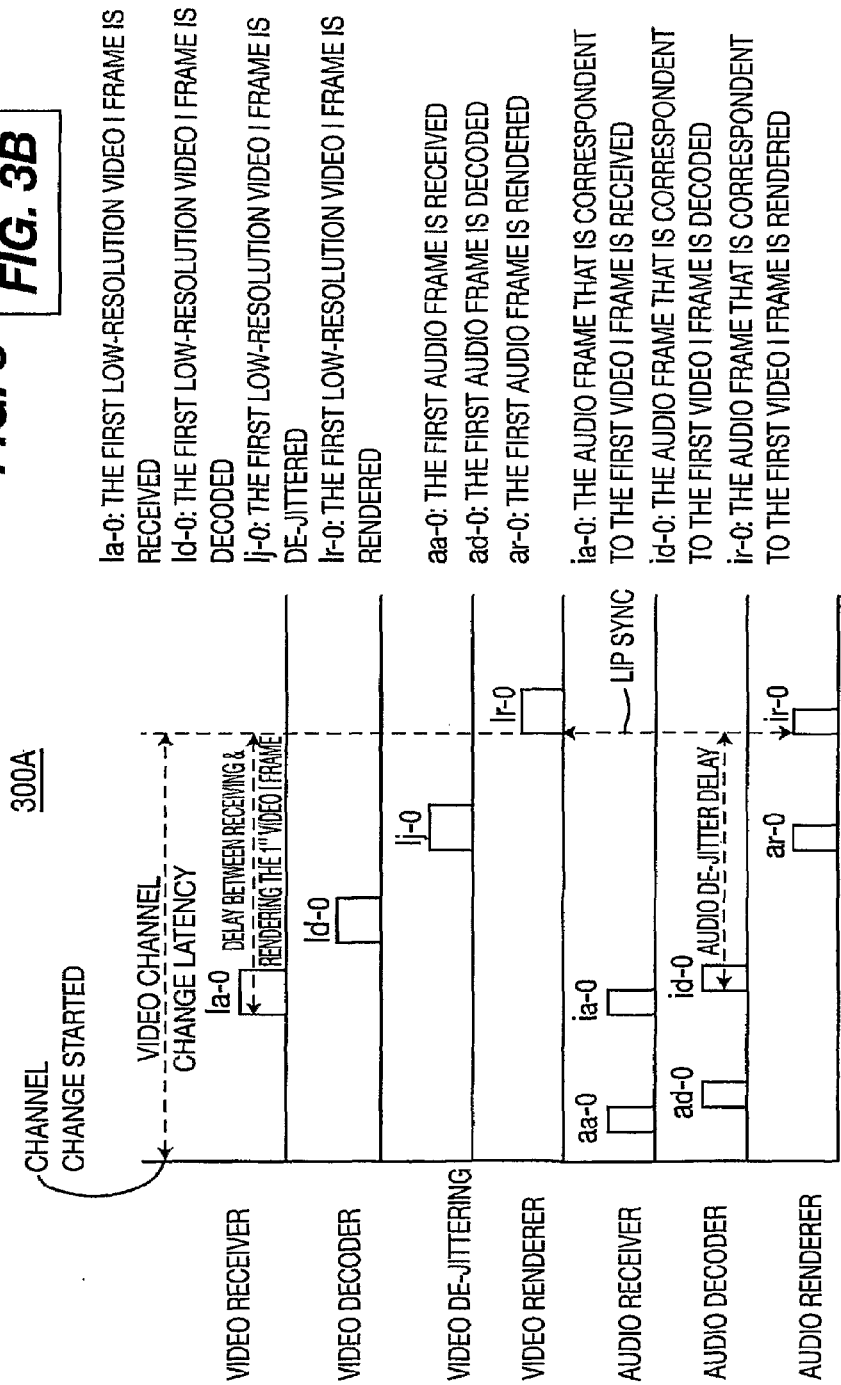

METHOD FOR REDUCING CHANNEL CHANGE TIMES AND SYNCHRONIZING AUDIO/VIDEO CONTENT DURING CHANNEL CHANGE

CROSS REFERENCE TO RELATED APPLICATION

This application claims the benefit, under 35 U.S.C. §365 of International Application PCT/US2006/47633, filed on Dec. 13, 2006, which was published in accordance with PCT Article 21(2) on May 15, 2008, in English and which claims the benefit of U.S. Provisional Patent Application No. 60/857,371, filed on Nov. 7, 2006, in English.

BACKGROUND OF THE INVENTION

1. Field of the Invention

The present invention generally relates to digital audio and video (A/V) apparatuses, and more particularly, to a method for reducing channel changes times and maintaining synchronization between audio and video content during a channel change event in a digital A/V apparatus.

2. Background Information

In a digital television broadcast system, allowing viewers to change channels rapidly is an important feature. There are at least two major sources that contribute to channel change delay. The first source is from the group of picture (GOP) structure used by many video compression standards, such as MPEG-2 and H. 264. In a GOP, pictures are encoded using either intra or inter coding. An intra coded (I) picture (a.k.a., frame) uses information within itself for compression, and therefore can be decoded alone. Inter-coded pictures (i.e., B or P pictures), however, must be decoded after the related intra coded pictures (I picture) are decoded. Since I pictures typically require 3 to 10 times more bits than a B or P picture, they are encoded much less frequently in the bit stream in order to reduce the overall bit rate. In a digital television broadcast system, I frames may only appear once every 1 to 2 seconds. When a digital A/V apparatus tunes to a program, it must wait until the first I frame is received before any picture can be decoded or displayed. This may cause a significant delay.

The second source for channel change delay is from processing components in the digital A/V apparatus (e.g., set-top box (SIB)). In an internet protocol television (IPTV) broadcast system, for example, various active components in the transport network may contribute jitter to the media streams. This jitter has to be reduced at the digital A/V apparatus to avoid presenting unpleasant artifacts to the users. Reducing such jitter at the digital A/V apparatus is typically accomplished through a buffering process, which can be a major source of delay in rendering video content during a channel change event. Since human beings tend to be more sensitive to audio jitter than to video jitter, received audio content generally needs to be more strongly de-jittered at the digital A/V apparatus. Stronger de-jittering for audio content leads to longer buffering, longer channel change times, and a potential for losing synchronization between audio and video content during a channel change event.

Accordingly, there is a need for a method for reducing channel changes times and maintaining synchronization between audio and video content during a channel change event in a digital A/V apparatus. The present invention addresses these and/or other issues.

SUMMARY OF THE INVENTION

In accordance with an aspect of the present invention, a method for changing channels in a digital audio and video apparatus is disclosed. According to an exemplary embodiment, the method comprises steps of receiving a first audio stream, a first video stream and a second video stream, wherein the first and second video streams represent the same program and the first video stream has at least one characteristic different from the second video stream; processing the first audio stream to generate a first processed audio stream; processing the first video stream to generate a first processed video stream; processing the second video stream to generate a second processed video stream having a delay with respect to the first processed audio stream; buffering the first processed audio stream to provide de-jittering; rendering the first processed audio stream and the second processed video stream in response to a channel change command; whereby synchronization between the first processed audio stream and the second processed video stream is maintained during a channel change; subsequently switching from the second processed video stream to the first processed video stream and rendering the first processed video stream; and whereby synchronization between the first processed audio stream and the first processed video stream is maintained during a channel change. The characteristic may include, for example, shorter GOP size, lower resolution, and/or lower bit-rate.

In accordance with another aspect of the present invention, a digital audio and video apparatus is disclosed. According to an exemplary embodiment, the digital audio and video apparatus comprises receiving means such as at least one signal receiver for receiving a first audio stream, a first video stream and a second video stream, wherein the first and second video streams represent the same program and the first video stream has at least one characteristic different from the second video stream; first audio processing means such as a first audio signal processor for processing the first audio stream to generate a first processed audio stream; first video processing means such as a first video signal processor for processing the first video stream to generate a first processed video stream; second video processing means such as a second video signal processor for processing the second video stream to generate a second processed video stream having a delay with respect to the first processed audio stream; buffering means such as a buffer for buffering the first processed audio stream to provide de-jittering; rendering means such as a renderer for rendering the first processed audio stream and the second processed video stream in response to a channel change command; whereby synchronization between the first processed audio stream and the second processed video stream is maintained during a channel change; switching means such as a switch for switching from the second processed video stream to the first processed video stream after the rendering means begins rendering the second processed video stream, and thereby causing the rendering means to begin rendering the first processed video stream; and whereby synchronization between the first processed audio stream and the first processed video stream is maintained during a channel change. The characteristic may include, for example, shorter GOP size, lower resolution, and/or lower bit-rate.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
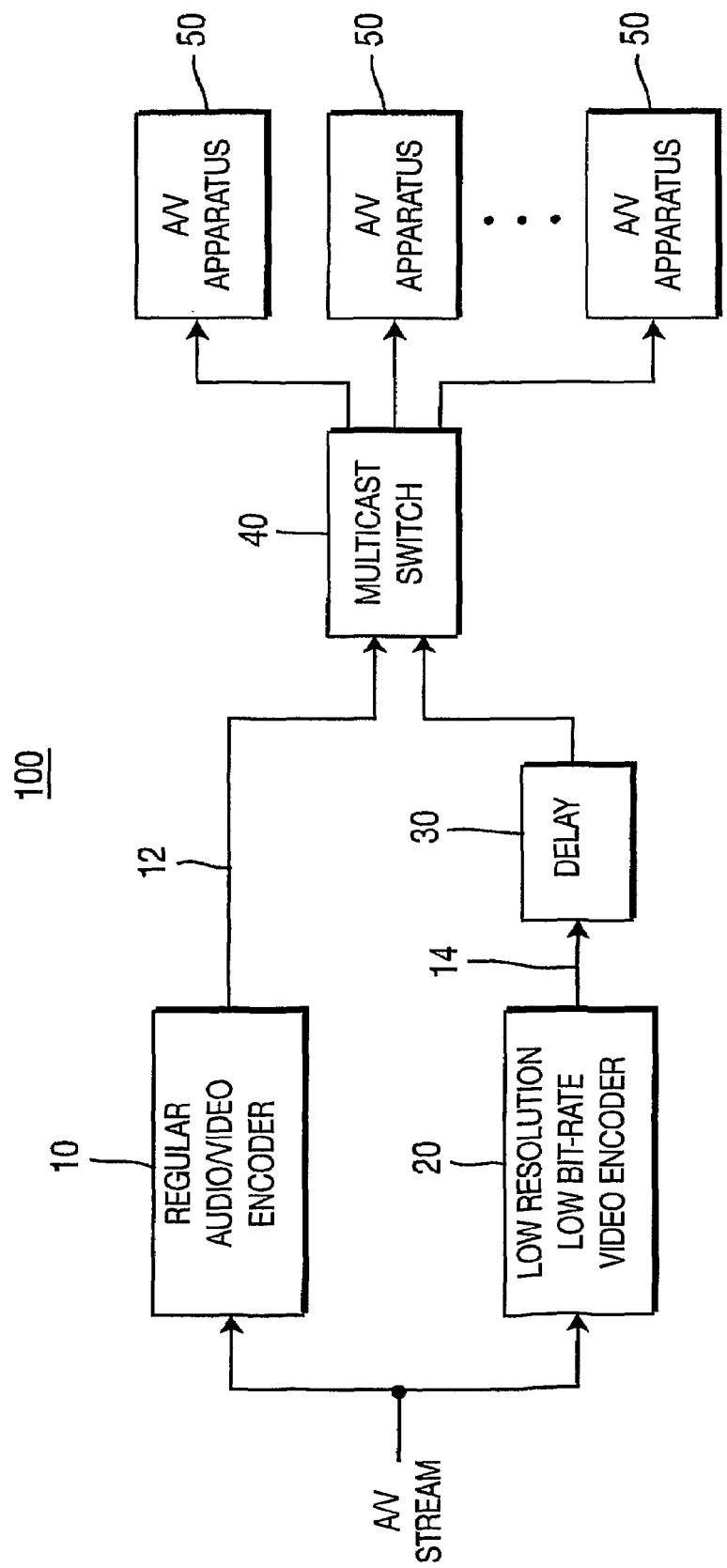
FIG. 1 is a block diagram of a system suitable for implementing the present invention.

Referring now to the drawings, and more particularly to FIG. 1, a block diagram of a system 100 suitable for implementing the present invention is shown. As indicated in FIG. 1, system 100 comprises a regular A/V encoder 10, a low resolution, low bit-rate video encoder 20, a delay unit 30, a multicast switch 40 and a plurality of digital A/V apparatuses 50. According to an exemplary embodiment, system 100 represents an IPTV broadcast system.

In system 100, encoders 10 and 20 simultaneously encode a broadcast program to a first compressed audio and video stream 12 which may be referred to herein as a "regular stream" and a second compressed video stream 14 which may be referred to herein as a "channel change stream" respectively. Regular stream 12 includes the elementary audio and video streams of the broadcast program. Channel change stream 14 includes the elementary video stream that corresponds to the elementary video stream of regular stream 12, but has at least one characteristic different from the elementary video stream of regular stream 12. Channel change stream 14 also does not include any audio content. According to an exemplary embodiment, the elementary video stream that makes up channel change stream 14 has a shorter GOP size (e.g. 0.5 second shorter, etc.), lower resolution (e.g., common intermediate format (CIF), etc.) and/or lower bit-rate (e.g., less than 200 kbps, etc.) than the elementary video stream of regular stream 12.

Delay unit 30 is operative to delay channel change stream 14 for a predetermined, configurable time period (e.g., 900 milliseconds, etc.). This delay may be adaptively controlled (e.g., adjusted), for example, by a service provider for system 100. Multicast switch 40 receives regular stream 12 from encoder 10 and the delayed channel change stream 14 from delay unit 20, and multicasts these streams 12 and 14 to A/V apparatuses 50. According to an exemplary embodiment, multicast switch 40 may be embodied as a Digital Subscriber Line Access Multiplexer (DSLAM).

In system 100, Internet Protocol (IP) multicast may be used to transmit compressed streams 12 and 14 through an IP backbone network to multicast join points, such as multicast switch 40, which selectively forward streams 12 and 14 to terminal devices, such as digital A/V apparatuses 50. According to an exemplary embodiment, the Internet Group Management Protocol (IGMP) may be used in system 100 for channel selection. For example, a terminal device such as one of digital A/V apparatuses 50 may send a join request for a desired channel to multicast switch 40 (e.g., DSLAM). When that channel is no longer desired, a leave request may be sent to multicast switch 40.

According to principles of the present invention, the lower bit-rate channel change (video) stream 14 is time-shifted by delay unit 30 to lag the regular (video and audio) stream 12 by a configurable time period (e.g., 900 milliseconds, etc.) to reduce channel change times. Because audio frames normally require more de-jitter buffering than video frames, without the time-shift between the lower bit-rate (video) channel change stream 14 and the regular (audio and video) stream 12, decoded video frames of lower bit-rate channel change stream 14 would go through the same de-jitter latency as the audio frames of regular stream 12. This would cause an increased delay in rendering the first video frame to users. Therefore, the added time shift introduced to channel change stream 14 by delay unit 30 reduces the video buffering latency during a channel change event. According to an exemplary embodiment, the delay provided by delay unit 30 can be introduced anywhere before multicast switch 40 in system 100. For example, the delay could be introduced at a streaming or proxy server (not shown in FIG. 1) located before multicast switch 40, as indicated in FIG. 1.

Figure 2:
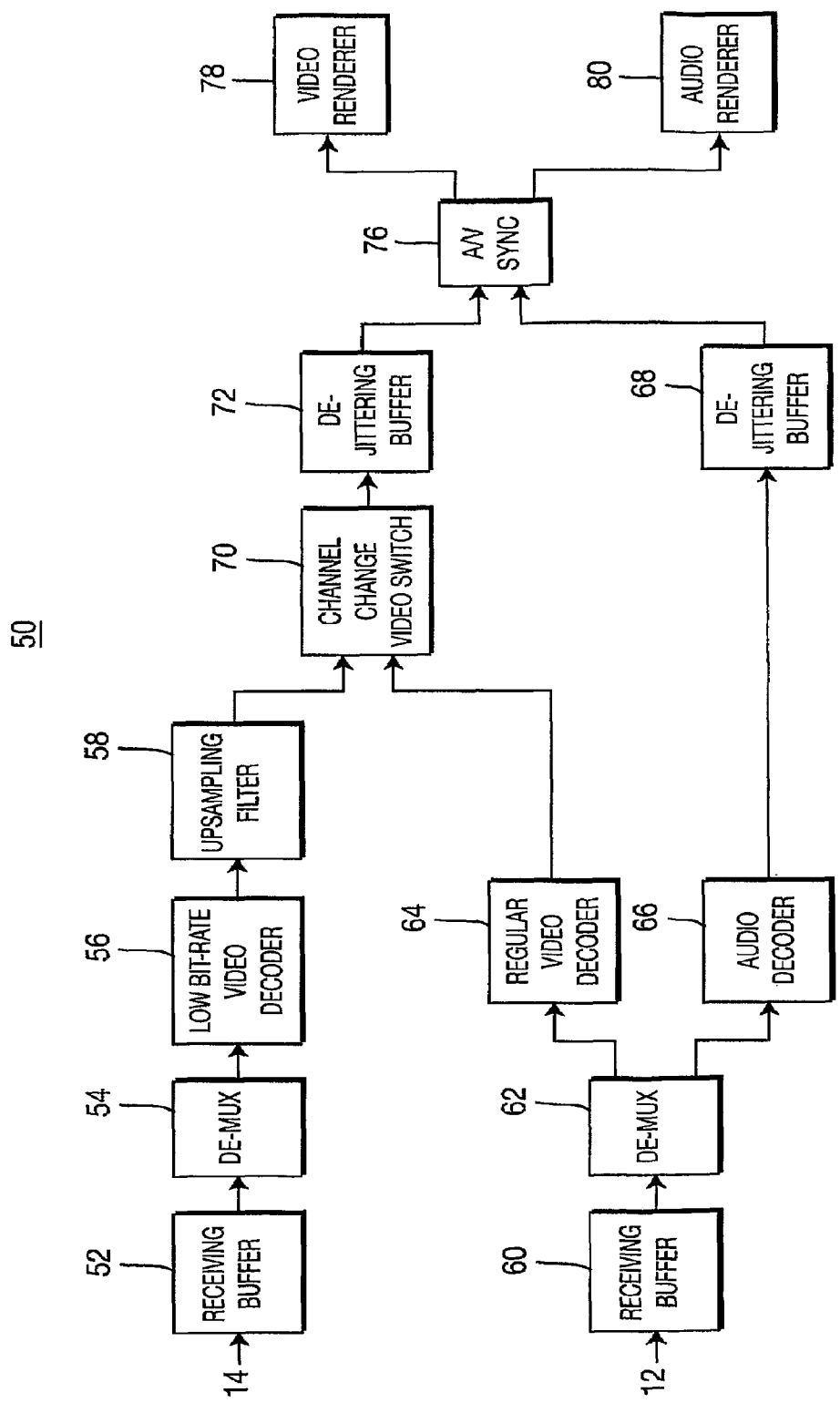
FIG. 2 is a block diagram providing further details of an individual digital A/V apparatus of FIG. 1 according to an exemplary embodiment of the present invention.

Referring to FIG. 2, a block diagram providing further details of an individual digital A/V apparatus 50 of FIG. 1 according to an exemplary embodiment of the present invention is shown. As indicated in FIG. 2, digital A/V apparatus 50 provides separate processing paths for channel change stream 14 and regular stream 12. The processing path for channel change stream 12 comprises a receiving buffer 52, a demultiplexer 54, a low bit-rate video decoder 56 and an upsampling filter 58. The processing path for regular stream 12 comprises a receiving buffer 60, a demultiplexer 62, a regular video decoder 64, an audio decoder 66 and a de-jittering buffer 68. Digital A/V apparatus 50 further comprises a channel change video switch 70, a de-jittering buffer 72, an A/V synchronization block 76, a video renderer 78 and an audio renderer 80. According to an exemplary embodiment, digital A/V apparatus 50 may be embodied as a set top box or any other type of digital A/V apparatus.

In FIG. 2, receiving buffer 52 receives and buffers channel change stream 14 to generate a buffered video stream which is de-multiplexed from its transport stream by demultiplexer 54 into a low bit-rate elementary video stream. Low bit-rate video decoder 56 decodes the low bit-rate elementary video stream to generate an uncompressed, low resolution video stream which is up-sampled by upsampling filter 58 to generate a processed video stream.

Also in FIG. 2, receiving buffer 60 receives and buffers regular stream 12 to generate buffered audio and video streams which are de-multiplexed from the transport stream by demultiplexer 62 into elementary audio and video streams. Regular video decoder 64 decodes the elementary video stream to generate an uncompressed, processed video stream. Audio decoder 66 decodes the elementary audio stream to generate an uncompressed, processed audio stream.

The processed video stream output from upsampling filter 58 (which corresponds to channel change stream 14) and the processed video stream output from regular video decoder 64 (which corresponds to the video content of regular stream 12) are both sent to channel change video switch 70. In response to a channel change command from a user, channel change video switch 70 switches the video content of channel change stream 14 (output from upsampling filter 58) to its output until it receives the first uncompressed I frame in the video content of regular stream 12 (output from regular video decoder 64). Thereafter, channel change video switch 70 switches the video content of regular stream 12 (output from regular video decoder 64) to the output and the lower resolution video content of channel change stream 14 (output from upsampling filter 58) is no longer used.

De-jittering buffer 72 buffers the video content (i.e., frames) output from channel change video switch 70 for de-jittering. De-jittering buffer 68 buffers the audio content (i.e., frames) output from audio decoder 66 for de-jittering. According to an exemplary embodiment, de-jittering buffers 68 and 72 may be located anywhere in between receiving buffers 52 and 60 and video and audio renderers 78 and 80. For purposes of example and explanation, however, FIG. 2 shows de-jittering buffers 68 and 72 located just before A/V synchronization block 76.

A/V synchronization block 76 assures that the audio and video content provided from de-jittering buffers 68 and 72 are rendered by audio and video renderers 80 and 78, respectively, according to their presentation timestamps based on a common system clock. In other words, A/V synchronization block 76 assures that audio and video content (e.g., frames) having the same presentation timestamp are rendered at the same time.

Figure 3B:
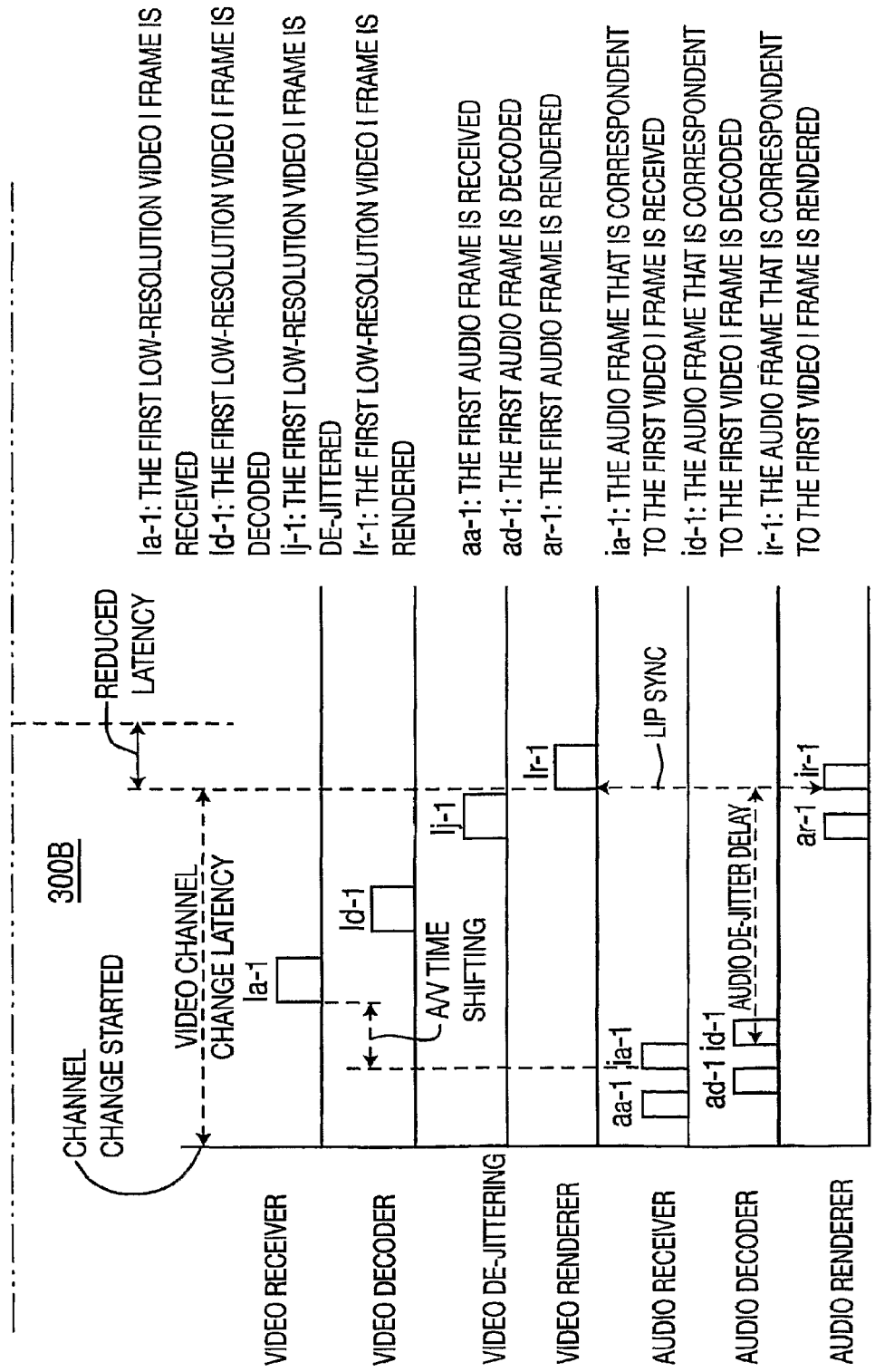
FIG. 3 is a timing diagram according to an exemplary embodiment of the present invention.

Referring now to FIG. 3, a timing diagram according to an exemplary embodiment of the present invention is shown. In particular, FIG. 3 shows the reduction of channel changes times provided by the present invention. The upper part of FIG. 3 represented by reference number 300A shows the timeline of video and audio frames without introducing a delay to channel change stream 14 via delay unit 30 in FIG. 1. In contrast, the lower part of FIG. 3 represented by reference number 300B shows the timeline of video and audio frames with a delay applied to channel change stream 14 via delay unit 30 in FIG. 1 in accordance with principles of the present invention.

In the upper part of FIG. 3 represented by reference number 300A, regular stream 12 and lower bit-rate channel change stream 14 are simultaneously encoded by encoders 10 and 20, respectively, and transmitted. No delay is applied to channel change stream 14 via delay unit 30 as shown in FIG. 1. The first audio frame in regular stream 12 is received by receiving buffer 60 of digital A/V apparatus 50 at time aa-0 and decoded by audio decoder 66 at time ad-0. The first audio frame in regular stream 12 is then buffered for de-jittering by de-jittering buffer 68 before being rendered by audio renderer 80 at time ar-0.

Since only intra-coded video frames (I frames) can be independently decoded, the first decodable and displayable video frame is the first video I frame received. Most of the time, the first video I frame received is from channel change stream 14 since I frames occur more frequently in channel change stream 14 than in regular stream 12. The first received video I frame is often received after the first audio frame. Assuming that the first video I frame of channel change stream 14 is received by receiving buffer 52 of digital A/V apparatus 50 at time Ia-0, this frame is decoded by decoder 56 at time Id-0 and then buffered for de-jittering by de-jittering buffer 72 at time Ij-0. After this first video I frame is de-jittered at time Ij-0, it is ready to be rendered and displayed. However, this first video I frame can not be rendered and displayed until the correspondent audio frame (i.e., frame i in the upper part of FIG. 3) is ready to be rendered because of the audio and video synchronization (i.e., lip sync) requirement. Since audio frames require longer buffering time for de-jittering than video frames (due to higher subjective sensitivity to audio jitter), the first video I frame has to wait until time Ir-0 (i.e., after audio frame i is de-jittered) to be rendered.

The upper part of FIG. 3 represented by reference number 300A shows the chronology of audio frame i in digital A/V apparatus 50. In particular, audio frame i is received by receiving buffer 60 at time ia-0, which is the same time when the first video I frame in channel change stream 14 is received by receiving buffer 52. Audio frame i is then decoded at time Id-0. After de-jittering, audio frame i is ready to be rendered at time ir-0, which is the actual rendering time for both audio frame i and the first video I frame. The upper part of FIG. 3 represented by reference number 300A demonstrates the added channel change time for video caused by the de-jittering time for audio frame i. Even though the first video I frame was ready to be rendered at time Ij-0, it has to wait until time Ir-0 when audio frame i is ready. The extra latency is the difference between time Ir-0 and time Ij-0.

The lower part of FIG. 3 represented by reference number 300B shows the improvement in channel change time provided by the present invention. In the lower part of FIG. 3, the lower resolution channel change stream 14 is intentionally delayed for a predetermined time period by delay unit 30 (see FIG. 1). The audio frame i that is correspondent to the first video I frame in channel change stream 14 is received at time ia-1, which is earlier than time Ia-1 when the first video I frame in channel change stream 14 is received. This difference in receiving times offsets the longer delay of audio de-jittering buffer 68. Therefore, video frame I is ready to be rendered at time ir-1, which is earlier than in the upper part of FIG. 3 represented by reference number 300A. In particular, the actual reduction in latency for video rendering is the difference between ir-1 and ir-0.

The lower part of FIG. 3 represented by reference number 300B illustrates another advantage of the present invention, namely that the time difference between when the first audio frame and the first video frame are rendered is shortened. In the upper part of FIG. 3 represented by reference number 300A, this time difference is the difference between ir-0 and ar-0. Conversely, in the lower part of FIG. 3 represented by reference number 300B, this time difference is the time difference between ir-1 and ar-1. This shortened time difference provides a better user experience.

According to one exemplary embodiment of the present invention, the following parameters may be used. A GOP size for channel change stream 14 is 500 milliseconds, which gives 250 milliseconds average delay in receiving the first video I frame. Buffering time for de-jittering channel change stream 14 is 50 milliseconds. Buffering time for de-jittering regular stream 12 is 350 milliseconds. Channel change stream 14 lags regular stream 12 by 250 milliseconds when the present invention is applied. Without applying the present invention, the average latency of rendering the first video I frame is about 250 milliseconds plus 350 milliseconds, or 600 milliseconds. The delay between when the first audio frame and the first video I frame are rendered is about 250 milliseconds. Conversely, after applying the present invention by delaying channel change stream 14 via delay unit 30 (see FIG. 1), the average latency of rendering the first video I frame is reduced to 250 milliseconds plus 350 milliseconds minus 250 milliseconds, or 350 milliseconds. Moreover, the delay between when the first audio frame and the first video I frame are rendered is reduced to about 0 milliseconds.

As described herein, the present invention provides a method for reducing channel changes times and maintaining synchronization between audio and video content during a channel change event in a digital A/V apparatus. The present invention may be applicable to various digital A/V apparatuses, either with or without an integrated display device. Accordingly, to the phrases "digital A/V apparatus" or "digital audio and video apparatus" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for reducing channel change time in a digital audio and video apparatus, said method comprising:
   receiving a regular stream comprising a first audio stream and a first video stream, and a channel change video stream representing a same program, wherein said first video stream has at least one characteristic different from said channel change video stream, and said channel change video stream is received with a delay in time with respect to the regular stream;
   processing said first audio stream to generate a first processed audio stream;
   processing said first video stream to generate a first processed video stream;
   buffering said first processed audio stream and said first processed video stream to provide de-jittering; and
   providing a synchronized presentation of said buffered first processed audio stream and said first processed video stream,
   wherein in response to a channel change request:
   processing said channel change video stream to generate a second processed video stream having a delay with respect to said first processed audio stream;
   buffering said first processed audio stream and said second processed video stream to provide de-jittering;
   providing a synchronized presentation of the buffered first processed audio stream and said second processed video stream in response to a channel change command, whereby synchronization between said first processed audio stream and said second processed video stream is maintained during a channel change event and channel change time is reduced by use of said channel change video stream that is delayed with respect to said regular stream, and subsequently switching from said second processed video stream to said first processed video stream and presenting said first processed video stream.

2. The method of claim 1, wherein said at least one characteristic includes at least one of bit rate, resolution and group of picture (GOP) size.

3. The method of claim 1, wherein said first audio stream, said first video stream and said channel change video stream are received via the internet.

4. A digital audio and video apparatus for reducing channel change time, comprising:
   receiving means for receiving a regular stream comprising a first audio stream and a first video stream, and a channel change video stream, which represent the same program and said first video stream has at least one characteristic different from said second video stream and said channel change video stream is received with a delay in time with respect to said audio stream;
   first audio processing means for processing said first audio stream to generate a first processed audio stream;
   first video processing means for processing said first video stream to generate a first processed video stream;
   second video processing means for processing said channel change video stream to generate a second processed video stream having a delay with respect to said first processed video stream;
   buffering means for buffering said first processed audio stream to provide de-jittering;
   synchronizing means for synchronizing presentation of said buffered first processed audio stream and said second processed video stream in response to a channel change command;
   whereby synchronization between said first processed audio stream and said second processed video stream is maintained during a channel change event, and channel change time is reduced by use of said channel change video stream having said delay with respect to said regular stream;
   switching means for switching from said second processed video stream to said first processed video stream subsequent to said channel change command.

5. The digital audio and video apparatus of claim 4, wherein said at least one characteristic includes at least one of bit rate, resolution and group of picture (GOP) size.

6. The digital audio and video apparatus of claim 4, wherein said first audio stream, said first video stream and said channel change video stream are received via the internet.

7. A digital audio and video apparatus for reducing channel change time, comprising:
   at least one signal receiver for receiving a regular stream comprising a first audio stream and a first video stream, and a channel change video stream, which represent the same program and said first video stream has at least one characteristic different from said second video stream, and said channel change video stream is received with a delay in time with respect to said audio stream;
   a first audio signal processor for processing said first audio stream to generate a first processed audio stream;
   a first video signal processor for processing said first video stream to generate a first processed video stream;
   a second video signal processor for processing said second video stream to generate a second processed video stream having a delay with respect to said first processed audio stream;
   a first buffer for buffering said first processed audio stream to provide de-jittering;
   a synchronizer that controls the output of said first processed audio stream and said second processed video stream in response to a channel change command to thereby provide synchronized presentation of said first processed audio stream and said second processed video stream;
   whereby synchronization between said first processed audio stream and said second processed video stream is maintained during a channel change event, and channel change time is reduced by the use of said channel change video stream having said delay with respect to said audio stream;
   a switch for switching from said second processed video stream to said first processed video stream subsequent to said channel change command.

8. The digital audio and video apparatus of claim 7, wherein said at least one characteristic includes at least one of bit rate, resolution and group of picture (GOP) size.

9. The digital audio and video apparatus of claim 7, wherein said first audio stream, said first video stream and said channel change video stream are received via the internet.

* * * * *